US010603769B2

(12) United States Patent
Chen

(10) Patent No.: US 10,603,769 B2
(45) Date of Patent: Mar. 31, 2020

(54) MAGNETIC TOOL CONNECTOR

(71) Applicant: JEI MOU INDUSTRIAL CO., LTD., Taichung (TW)

(72) Inventor: Po-Shen Chen, Taichung (TW)

(73) Assignee: Jei Mou Industrial Co., Ltd., Taichung (TW)

( * ) Notice: Subject to any disclaimer, the term of this patent is extended or adjusted under 35 U.S.C. 154(b) by 173 days.

(21) Appl. No.: 15/661,038

(22) Filed: Jul. 27, 2017

(65) Prior Publication Data

US 2018/0050440 A1 Feb. 22, 2018

(30) Foreign Application Priority Data

Aug. 18, 2016 (TW) ............................ 105126460 A

(51) Int. Cl.
*B25B 23/12* (2006.01)
*B25B 13/06* (2006.01)
*B23B 23/00* (2006.01)
*B25B 23/00* (2006.01)

(52) U.S. Cl.
CPC .............. *B25B 23/12* (2013.01); *B25B 13/06* (2013.01); *B25B 13/065* (2013.01); *B25B 23/0035* (2013.01)

(58) Field of Classification Search
CPC ..... B25B 23/12; B25B 23/0035; B25B 13/06; B25B 13/065
USPC ........................................................ 81/125.1
See application file for complete search history.

(56) References Cited

U.S. PATENT DOCUMENTS

| | | | | |
|---|---|---|---|---|
| 2,624,223 | A * | 1/1953 | Clark | B25B 23/12 7/901 |
| 5,163,345 | A * | 11/1992 | Doan | B25B 13/06 76/114 |
| 6,311,988 | B1 | 11/2001 | Wilson | |
| 8,172,236 | B2 | 5/2012 | Shibata | |
| 8,479,616 | B2 * | 7/2013 | Tsai | B25B 13/06 279/128 |
| 8,667,872 | B2 | 3/2014 | McCullough et al. | |
| 9,381,627 | B2 | 7/2016 | Chen | |

FOREIGN PATENT DOCUMENTS

| | | | |
|---|---|---|---|
| TW | 397740 | B | 7/2000 |
| TW | 414133 | U | 12/2000 |
| TW | 551257 | U | 9/2003 |
| TW | M245010 | U | 10/2004 |
| TW | I264347 | B | 10/2006 |

(Continued)

*Primary Examiner* — Hadi Shakeri
(74) *Attorney, Agent, or Firm* — Alan D. Kamrath; Karin L. Williams; Mayer & Williams PC

(57) ABSTRACT

A magnetic tool connector has a main body including a driven end and a working end. The working end defines a first chamber and second chamber. The first chamber is configured to receive an object to be driven. The second chamber has an opening at an end edge of the first chamber. The end edge of the first chamber defines an abutting surface for positioning the object within the first chamber. A magnetic assembly is slidably coupled to the main body and includes a magnet. The magnetic assembly is movable between a first position in which the magnet is located outside of the second chamber and a second position in which the magnet is located within the second chamber.

7 Claims, 5 Drawing Sheets

(56) References Cited

FOREIGN PATENT DOCUMENTS

| | | | |
|---|---|---|---|
| TW | M318490 | U | 9/2007 |
| TW | M342237 | U | 10/2008 |
| TW | M357342 | U | 5/2009 |
| TW | M362737 | U | 8/2009 |
| TW | M369224 | U | 11/2009 |
| TW | M396182 | U | 1/2011 |
| TW | M402173 | U | 4/2011 |
| TW | M429565 | U | 5/2012 |
| TW | I417172 | B | 12/2013 |
| TW | I444257 | B | 7/2014 |
| TW | I444258 | B | 7/2014 |
| TW | I455799 | B | 10/2014 |
| TW | I458597 | B | 11/2014 |
| TW | M508406 | U | 9/2015 |
| TW | I504487 | B | 10/2015 |
| TW | M518612 | U | 3/2016 |
| TW | M525819 | U | 7/2016 |

* cited by examiner

MAGNETIC TOOL CONNECTOR

BACKGROUND OF THE INVENTION

1. Field of the Invention

The present invention relates to a tool connector and, particularly, to a tool connector configured to connect a tool by magnetic attraction.

2. Description of the Related Art

TW Pat. No. 396182 shows a magnetic tool connector. The magnetic tool connector includes a body having a driven end at one end connectible to a driving tool and a working end connectible to a driven object at another end. The working end includes a magnet assembly configured to magnetically attract the driven object. The working end defines a hole. The magnet assembly includes an end in thread engagement with the hole. The magnet assembly includes a housing and a magnet disposed in the housing. The magnet is located outside of the hole.

When driving the driven object, the magnet is impacted by the driven object. The magnet is also subject to vibrational disturbance. Therefore, the magnet is easily damaged.

The present invention is, therefore, intended to obviate or at least alleviate the problems encountered in the prior art.

SUMMARY OF THE INVENTION

According to the present invention, a magnetic tool connector includes a main body having a first end and a second end and including a driven end at the first end and a working end at the second end respectively. The working end defines a first and second chamber. The first chamber is configured to receive an object to be driven. The first chamber has a first opening at an end edge of the working end. The second chamber has a second opening at an end edge of the first chamber. The end edge of the first chamber defines an abutting surface for positioning the object within the first chamber. A magnetic assembly is slidably coupled to the main body and includes a magnet configured to magnetically attract the object. The magnetic assembly is movable between a first position in which the magnet is located outside of the second chamber and a second position in which the magnet is located within the second chamber and is prevented from being impacted and damaged by the object. The magnet includes an engaging side configured to abut and magnetically attract the object, and the engaging side is flush with the abutting surface when the magnetic assembly is in the second position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
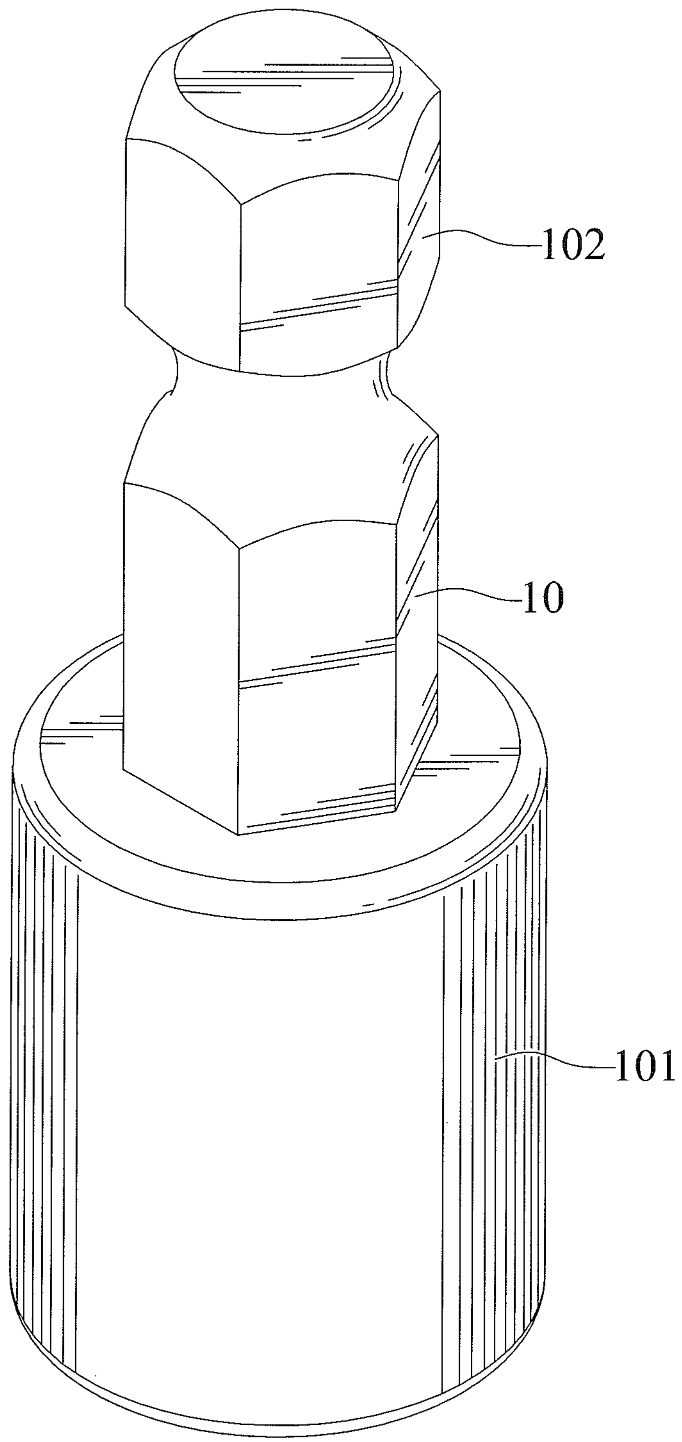
FIG. 1 is a perspective view of a magnetic tool connector in accordance with the present invention.
Figure 2:
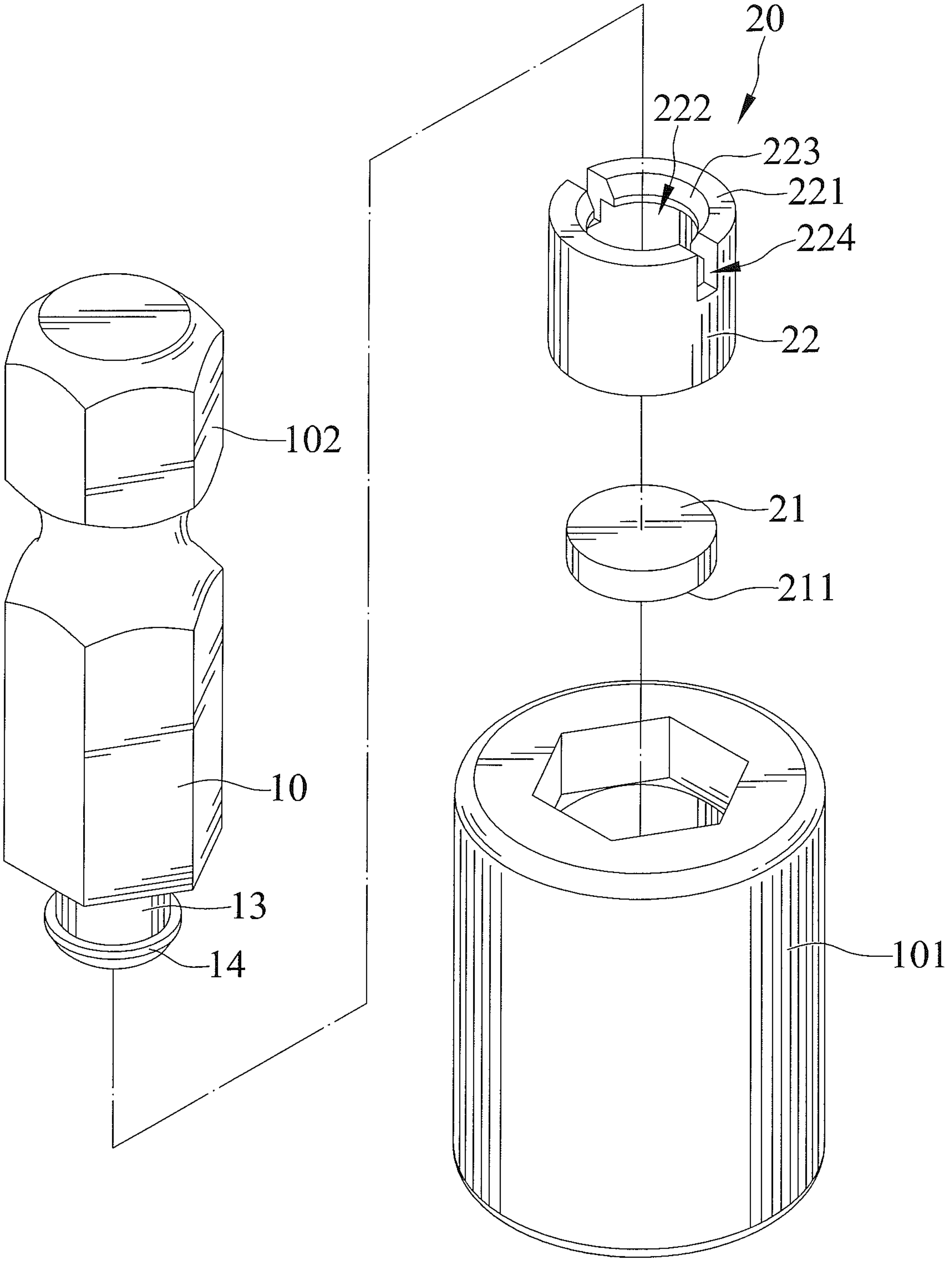
FIG. 2 is an exploded perspective view of the magnetic tool connector of the present invention.
Figure 3:
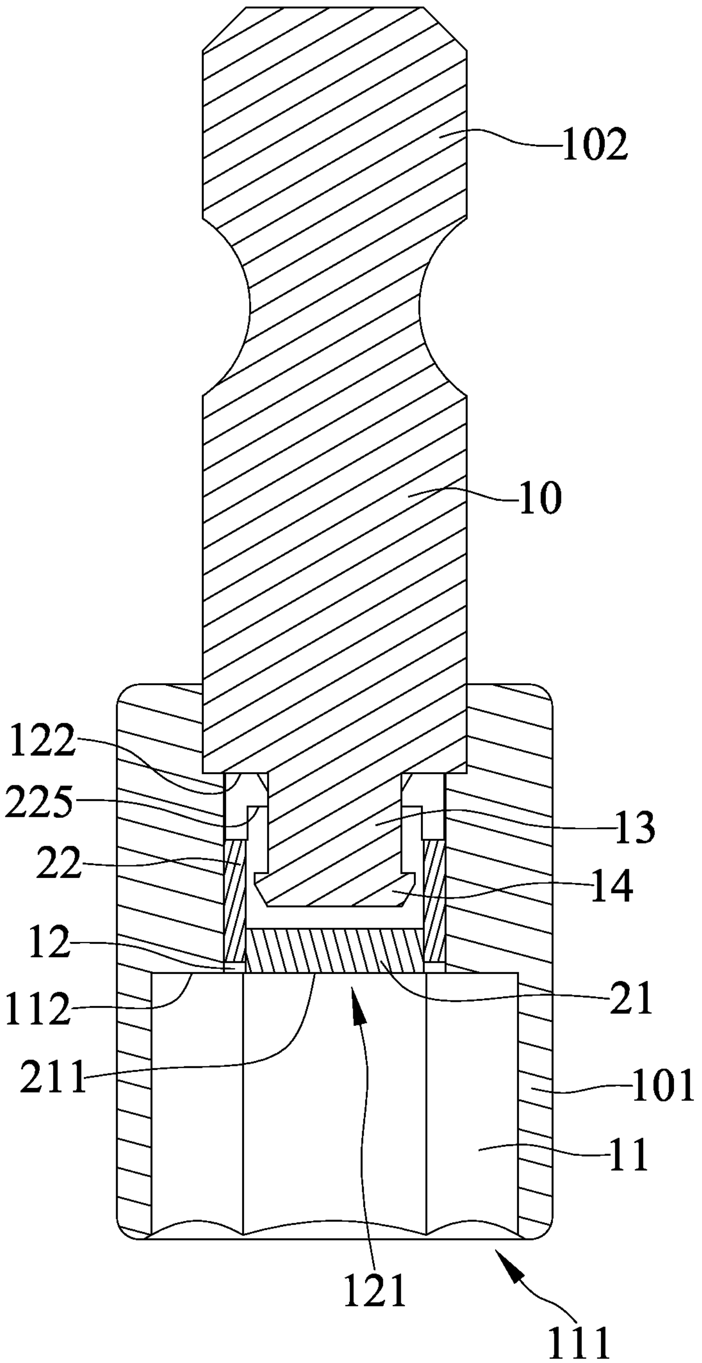
FIG. 3 is a cross-sectional view of the magnetic tool connector of the present invention.

FIGS. 1 through 5 show a magnetic tool connector of the present invention. A main body 10 has a first end 101 and a second end 102 and includes a driven end at the first end 101 and a working end at the second end 102 respectively. The working end defines a first and second chamber 11 and 12. The first chamber 11 is configured to receive an object P to be driven. The first chamber 11 has a first opening 111 at an end edge of the working end. The second chamber 12 has a second opening 121 at an end edge of the first compartment 11. The end edge of the first compartment 11 defines an abutting surface 112 for positioning the object P within the first chamber 11. The first chamber 11 has a polygonal cross-section. The second chamber 12 has a circular cross-section. A distance between two opposite sides of the first chamber 11 is greater than a diameter of the second chamber 12. The first chamber 11 has a hexagonal cross-section. The housing 22 has a circular cross-section.

A magnetic assembly 20 is slidably coupled to the main body 10. The magnetic assembly 20 includes a magnet 21 configured to magnetically attract the object P and a housing 22 supporting the magnet 21. The main body 10 includes a connecting structure and the housing 22 is slidably connected to the connecting structure. The connecting structure extends within the second chamber 12. The connecting structure includes a first shoulder 122, a guide protrusion 13, and a second shoulder 14. The first and second shoulders 122 and 14 extend at opposite ends of the guide protrusion 13. The first and second shoulders 122 and 14 extend radially outwardly from the guide protrusion 13. The second shoulder 14 is disposed in a hole 222 defined by the housing 22.

The second shoulder 14 inserts in the housing 22 through the hole 222. The magnet 21 is disposed in the hole 222. The housing 22 includes a flange 223 at an end engaging the guide protrusion 13 and movably restrained between the first and second shoulders 122 and 14. The flange 223 extends annularly and has a tab protruding radially inwardly.

The main body 10 includes a first structure in a form of a shaft and a second structure in a form of a socket. The shaft includes the guide protrusion 13 and the first and second shoulders 122 and 14 at a first end thereof and the driven end at a second end thereof. The second structure defines the first and second chambers 11 and 12 and includes a first open end defined by the first opening 111. The second structure includes a second open end opposite the first open end and communicating with the second chamber 12. The guide protrusion 13 and the first and second shoulders 122 and 14 are inserted through the second open end into the second chamber 12. The shaft and the socket are not free to move with respect to each other. The shaft and socket are in tight engagement with one another.

The magnetic assembly 20 is movable between a first position in which the magnet 21 is located outside of the second chamber 12 and a second position in which the magnet 21 is located within the second chamber 12 and is prevented from being impacted and damaged by the object P. The magnet 21 includes an engaging side 211 configured to abut and magnetically attract the object P. The engaging side 211 is flush with the abutting surface 112 when the magnetic assembly 20 is in the second position. The engaging side 211 of the magnet 21 is not flush with the abutting surface 112 when the magnetic assembly 20 is in the first position. The engaging side 211 of the magnet 21 and the abutting surface 112 are aligned with an axis A when the magnetic assembly 20 is in the second position. Furthermore, the tab of the flange 223 has a top edge 221 selectively abutting the first shoulder 122 and a bottom edge 225 selectively abutting the second shoulder 14. When the magnetic assembly 20 is in the first position, the top edge 221 and the first shoulder 122 are not abutted with one another, and the bottom edge 225 and the second shoulder 14 are abutted with one another. When the magnetic assembly 20 is in the second position, the top edge 221 and the first shoulder 122 are abutted with one another, and the bottom edge 225 and the second shoulder 14 are not abutted with one another. In addition, the top edge 221 defines the top surface of the housing 22.

The flange 223 includes a first beveled surface extending between the top and bottom edges 221 and 225. The second shoulder 14 includes a second beveled surface. The housing 22 includes at least one groove 224 extending through inner and outer peripheries thereof. The at least one groove 224 extends radially from the hole 222. The first beveled surface facing inwardly. The second beveled surface facing outwardly. The at least one groove 224 facilitates deflection of the flange 223. The first and second beveled surfaces and the at least one groove 224 facilitate engagement of the housing 22 with the guide protrusion 13.

Figure 4:
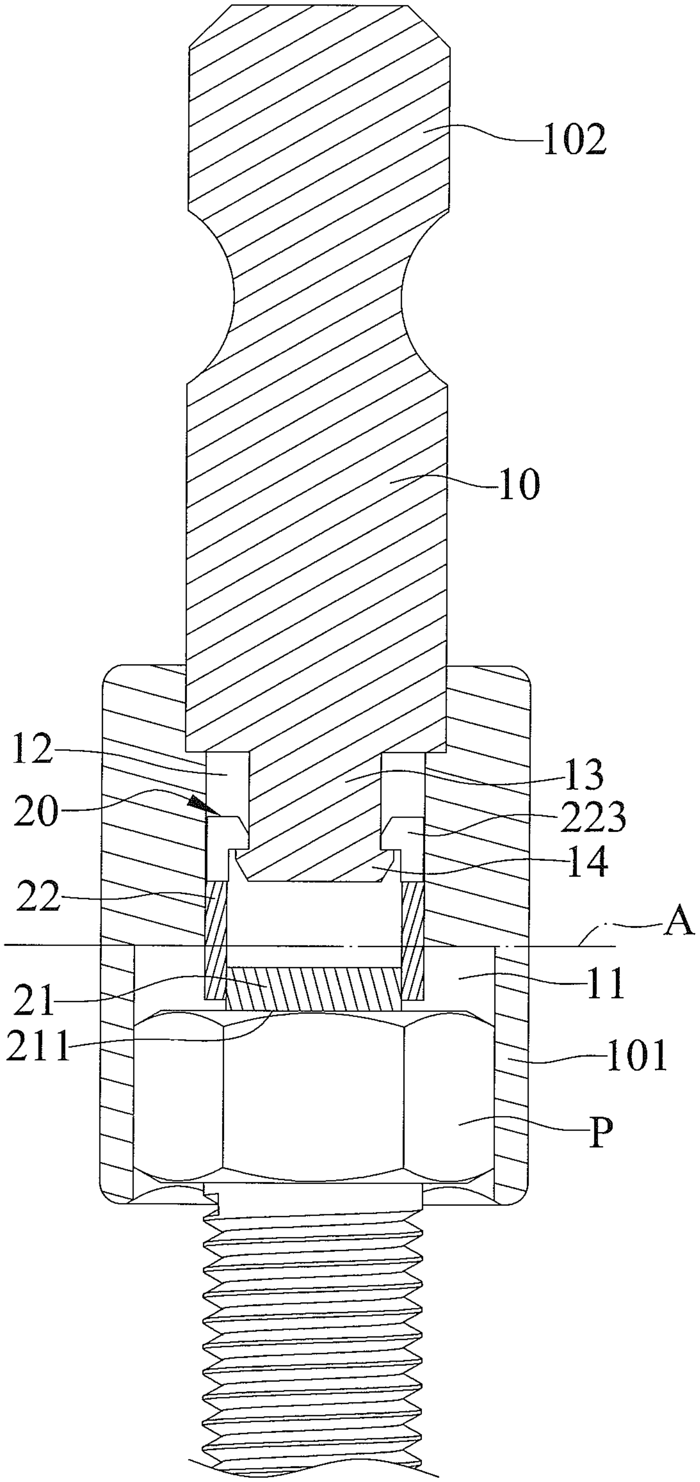
FIG. 4 is a cross-sectional view showing the magnetic tool connector of the present invention receiving a driven object.
Figure 5:
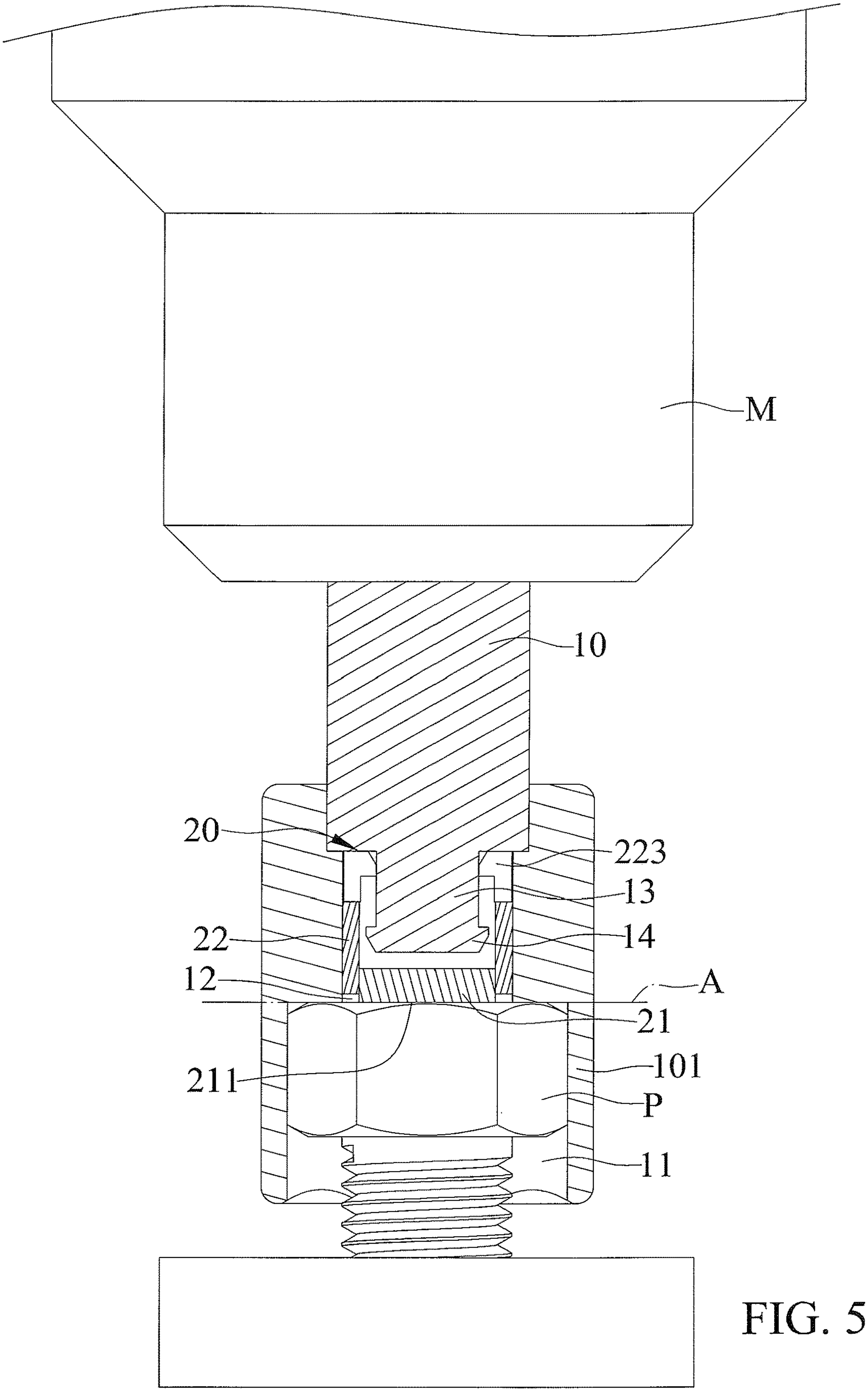
FIG. 5 is a cross-sectional view showing a driving tool driving the driven object through the magnetic tool connector of the present invention.

FIG. 4 shows the object P to be driven is disposed in the first compartment 11, and the magnetic assembly 20 is in the first position. FIG. 5 shows a driving tool M can engage the driven end to drive the magnetic tool connector. When the object P is driven into another object, the object P is rest on the abutting surface 112, and the magnetic assembly 20 is moved to the second position.

In view of the forgoing, the magnet 21 is located within the second chamber 12 when the magnetic assembly 20 is in the second position, the engaging side 211 of the magnet 21 and the abutting surface 112 are flush with one another and are aligned with the axis A, and the abutting surface 112 prevents the object P from impacting the magnet 21. Therefore, the magnet 21 is not impacted and damaged by the object P.

The foregoing is merely illustrative of the principles of this invention, and various modifications can be made by those skilled in the art without departing from the scope and spirit of the invention.

What is claimed is:

1. A magnetic tool connector comprising:

a main body having a first end and a second end and including a driven end at the first end and a working end at the second end respectively, with the working end defining a first and second chamber, with the first chamber configured to receive an object to be driven, with the first chamber having a first opening at an end edge of the working end, with the second chamber having a second opening at an end edge of the first chamber, and with the end edge of the first chamber defining an abutting surface for positioning the object within the first chamber; and a magnetic assembly slidably coupled to a connecting structure of the main body which is unmovably located in the second chamber and bearing a magnet configured to magnetically attract the object, wherein the magnetic assembly is movable between a first position in which the magnet is located outside of the second chamber and a second position in which the magnet is located within the second chamber and is prevented from being impacted and damaged by the object, and wherein the magnet includes an engaging side configured to abut and magnetically attract the object, and the engaging side is flush with the abutting surface when the magnetic assembly is in the second position, wherein the magnetic assembly includes a housing and the magnet is supported by the housing, and wherein the housing is slidably coupled to the main body, wherein the housing is slidably connected to the connecting structure, and wherein the connecting structure includes a first shoulder, a guide protrusion, and a second shoulder, with the first and second shoulders extending at opposite ends of the guide protrusion, and wherein the housing includes a flange at an end engaging the guide protrusion and movably restrained between the first and second shoulders.

2. The magnetic tool connector as claimed in claim 1, wherein the flange extends annularly and has a tab protruding radially inwardly, wherein the tab has a top edge selectively abutting the first shoulder and a bottom edge selectively abutting the second shoulder, wherein when the magnetic assembly is in the first position, the top edge and the first shoulder are not abutted with one another, and the bottom edge and the second shoulder are abutted with one another, and wherein when the magnetic assembly is in the second position, the top edge and the first shoulder are abutted with one another, and the bottom edge and the second shoulder are not abutted with one another.

3. The magnetic tool connector as claimed in claim 2, wherein the flange includes a first beveled surface extending between the top and bottom edges, wherein the second shoulder includes a second beveled surface, and wherein the housing includes at least one groove extending through inner and outer peripheries thereof.

4. The magnetic tool connector as claimed in claim 3, wherein the second shoulder is disposed in a hole defined by the housing, and wherein the magnet is disposed in the hole.

5. The magnetic tool connector as claimed in claim 4, wherein the first chamber has a polygonal cross-section, wherein the second chamber has a circular cross-section, and wherein a distance between two opposite sides of the first chamber is greater than a diameter of the second chamber.

6. The magnetic tool connector as claimed in claim 1, wherein the main body includes a first structure in a form of a shaft and a second structure in a form of a socket, wherein the shaft includes the guide protrusion and the first and second shoulders at a first end thereof and the driven end at a second end thereof, wherein the second structure defines the first and second chambers and includes a first open end defined by the first opening.

7. The magnetic tool connector as claimed in claim 6, wherein the second structure includes a second open end opposite the first open end and communicating with the second chamber.

* * * * *